United States Patent [19]
Hylak et al.

[11] Patent Number: 5,112,551
[45] Date of Patent: May 12, 1992

[54] METHOD OF MOLDING AN IMPROVED LINKAGE LEVER

[75] Inventors: Peter J. Hylak, Northbrook; Gary L. Berge, Crystal Lake, both of Ill.

[73] Assignee: E & H Plastics, Inc., Chicago, Ill.

[21] Appl. No.: 578,419

[22] Filed: Sep. 7, 1990

[51] Int. Cl.$^5$ .............................................. B29C 45/13
[52] U.S. Cl. .............................. 264/219; 264/328.8; 264/328.12; 425/573; 425/577
[58] Field of Search ............. 264/328.8, 328.9, 328.12, 264/328.1, 219; 425/573, 577

[56] References Cited

U.S. PATENT DOCUMENTS

| | | | |
|---|---|---|---|
| 3,051,994 | 9/1962 | Carozzo | 425/573 |
| 4,399,093 | 8/1983 | Kirby et al. | 264/328.12 |
| 4,722,821 | 2/1988 | Vermilye | 264/328.12 |

FOREIGN PATENT DOCUMENTS

| | | | |
|---|---|---|---|
| 2286702 | 6/1976 | France | 425/573 |

*Primary Examiner*—Jan H. Silbaugh
*Assistant Examiner*—Brian J. Eastley

[57] ABSTRACT

A method of molding a flipper link to reduce or eliminate the tendency of the flipper link to break. The method includes the steps of forming a mold cavity for forming a flipper link having a first end portion, a second end portion and an intermediate necked-down portion. The necked-down portion provides an area between the first and second end portions which more easily twists and absorbs the stress exerted on the flipper link during use. Pins are provided in the cavity for forming an aperture in each of the first and second end portions. Plastic material is injected into the cavity at each end of the first and second end portions such that the plastic material flows into the cavity about the pins and the knit line or lines are formed in the flipper link in a location substantially centrally of the necked-down portion to thereby transfer the stress on the flipper link away from the apertures so as to substantially eliminate the tendency of the flipper link to break about the apertures.

1 Claim, 1 Drawing Sheet

METHOD OF MOLDING AN IMPROVED LINKAGE LEVER

This invention relates to an improved linkage lever and to the method of molding the same. More particularly, the invention relates to what is commonly referred to as a flipper link used in pinball machines.

Pinball machines include one or more flippers which are activated by a player to strike a ball as it is in play. These flippers are part of an assembly which generally includes a solenoid which is electrically operated, a flipper, and a link which couples the solenoid and the flipper together such that, upon operation of the solenoid, the flipper is pivotally operated to strike a ball in play. That link coupling the solenoid and the flipper is commonly called the flipper link. The flipper links are subject to a number of different stresses during play including tension, compression and torsion stresses. As a result of these stresses, the flipper links frequently break. The flipper links are relatively inexpensive in comparison to the majority of the other components of the pinball machine, but it is a critical element, since the play of the pinball machine is seriously affected if the flippers are inoperative because of a broken flipper link.

Most, if not all, of the available flipper links are rather massive and are formed that way in an effort to overcome breakage. Many are generally rectangular in shape and have a substantial width. All of the flipper links have at least two spaced apart apertures for receiving the pivot pins for coupling the solenoid and the flipper together. These flipper links have been fabricated of various different materials such as metal, plastic and reinforced plastic and the like, all in an effort to provide a flipper link which would not break from the constant stresses exerted on them. However, the flipper links fabricated of metal do not stand up under constant stress and usually break simply from metal fatigue. The flipper links fabricated from a reinforced plastic material such as Bakelite or a similar material will break after a period of time if they are not stamped with a very sharp stamping die. If the die is not sharp, a fracture usually occurs in the link when they are stamped and the links ultimately break at this fracture point after a period of time. The links molded of plastic usually break about the apertures or the knit lines which form in them during the molding process. The knit lines occur at different areas of the link depending upon the manner in which the plastic is injected into the mold.

Accordingly, considerable efforts have been made to overcome the breakage problem associated with these flipper links, and the industry is still seeking one which is far less subject to breakage.

It is an object of the invention to provide an improved flipper link and a method of molding it of a plastic material.

The above, as well as other objects and features of the invention, are provided by the flipper link which is designed so as to effectively transfer the stress exerted on the flipper link to a point remote from the two apertures in the link through which the pivot pins extend. By transferring the stress on the flipper link away from the apertures, the tendency of the flipper links to break about the apertures is substantially eliminated. Also, the knit line or lines in the flipper link is likewise transferred to a location centrally disposed between the two apertures, and thus the tendency of the links to break about the apertures is still further reduced or eliminated. Further still, the intermediate portion of the flipper link between the two apertures is necked-down so as to provide an area which more easily twists and absorbs the stress, particularly the torsion stress, exerted on the flipper link to thereby still further eliminate the tendency for the flipper link to break about the apertures.

The manner in which the above objects and features of the invention are accomplished with the flipper links of the invention will be apparent from the following description when considered in conjunction with the following drawings, wherein.

Figure 1:
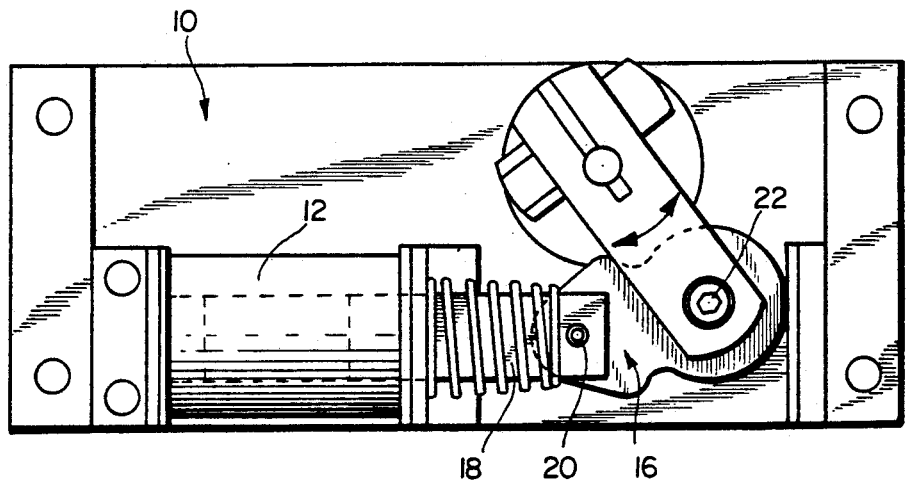
FIG. 1 is a top plan view of a flipper assembly.

Referring now to the drawings, in FIG. 1 there is illustrated a flipper assembly 10 typical of those presently used in pinball machines. These flipper assemblies 10 generally include a solenoid 12, a flipper 14 and a flipper link 16. The flipper link 16 is pivotally coupled to the plunger 18 of the solenoid 12 by means of a pivot pin 20 and is pivotally coupled to the flipper 14 by means of a pivot pin 22. The solenoid 12 is operated, usually by a player operating a pushbutton, which functions to couple electrical power to the solenoid to cause it to retract its plunger 18. The plunger 18, upon being retracted, moves the flipper link 16 so as to pivotally operate the flipper 14. As a result of this action of the flipper assembly 10, considerable stress is exerted on the flipper link 16. As indicated above, this stress causes the flipper link 16 to frequently break rendering the flipper assemblies inoperable.

Figure 2:
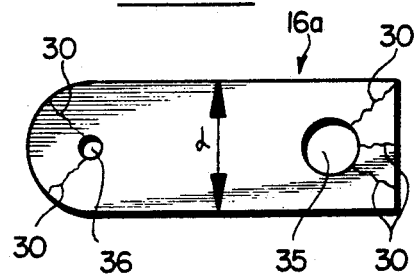
FIG. 2 is a top plan view of a flipper link representative of the prior art.

In FIG. 2 there is illustrated a flipper link 16a which is generally representative of those presently available and being used by the industry. As it can be seen, the flipper link 16a is generally rectangular in shape and has a substantial width "d". Two apertures 35 and 36 are formed in them for receiving the pivot pins for coupling the solenoid and the flipper together.

As discussed above, the flipper links of this type which were fabricated of metal usually fail after a period of use simply because of metal fatigue. Those fabricated of reinforced plastic, unless they are stamped with a very sharp dye, would usually have one or more fractures formed in them and they would break after a period of use where those fractures occur. Accordingly, it is difficult if not impossible to maintain quality control over these flipper links because the fractures are not always visually apparent upon inspection of the flipper links. Those molded of plastic break about the apertures or at the knit lines formed during the molding process. The knit lines form in different areas of the flipper links depending upon where and how the plastic is injected into the mold in which the flipper links are formed. In most cases, the plastic material is gated into the mold through only one gate and the plastic material is forced to flow through the mold and about the pin means in the mold cavity which form the apertures in the flipper links. As a result, the knit lines often form in the vicinity of the apertures of the finished product. When many different types of stress are exerted on the flipper links, they break at these knit lines. In FIG. 2, the fractures and the knit lines occurring in these flipper links are generally illustrated by the lines 30. It can be seen that they generally occur in the vicinity of the apertures in the flipper link.

Figure 3:
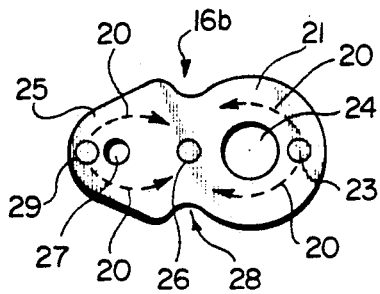
FIG. 3 is a top plan view of a flipper link exemplary of a first embodiment of the invention.
Figure 4:
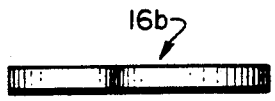
FIG. 4 is a side plan view of the flipper links of FIG. 3.

In FIGS. 3 and 4 there is illustrated flipper link 16b which is exemplary of a first embodiment of the invention. The flipper link 16b has an end portion 21 in which there is formed an aperture 24, and an end portion 25 in which there is formed an aperture 27. Between these two end portions 21, 25 there is a necked-down portion 28. The necked-down portion 28, being reduced in width in comparison to the end portions 21, 25, permits the flipper link 16b to more easily twist in this area of the link so as to effectively transfer the torsion stress exerted on the flipper link away from the end portions and the areas thereof surrounding the apertures. Accordingly, the flipper link 16b is found to be far less subject to breakage, since the torsional stress normally exerted on the flipper link about the apertures 24, 27 now are exerted on the necked-down portion 28.

The tendency of the flipper link 16b to break is still further reduced by transferring the knit line or lines which normally form in the link to the necked-down portion 28 of the link. This is accomplished by injecting the plastic material into the mold through at least two spaced apart gates in the mold. In this case, the mold has three ejection pins, represented by the dotted circles 23, 26, 29, for ejecting the part from the mold. The plastic material is injected through the two apertures through which the ejection pins 23, 29 extend into the mold, at the two opposite ends of the cavity in which the flipper link is molded. The apertures through which the ejection pins 23, 29 extend into the mold cavity therefor are used as the gates through which the plastic material is injected into the mold to form the flipper link. Accordingly, since the gates for injecting the plastic material into the mold cavity are located and spaced apart at the extreme opposite ends of the mold cavity, the plastic material is caused to flow about both sides of each of the pin means in the mold forming the apertures in the end portions of the flipper link (as generally represented by the dotted lines 20) and effectively merge and join together centrally in the necked-down portion 28 of the flipper link. The knit line or lines therefor are transferred to the necked-down portion 28 of the flipper link away from the apertures 24, 29 and the tendency of the flipper link to break is still further reduced or eliminated.

Figure 5:
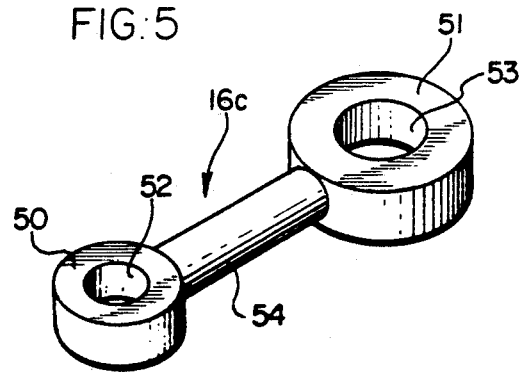
FIG. 5 is a perspective view of a flipper link exemplary of a second embodiment of the invention.

In FIG. 5, there is illustrated another flipper link 16c molded in accordance with the invention. The flipper link 16c has two end portions 50 and 51, and apertures 52 and 53 are formed in these end portions 50, 51 and are for receiving the pivot pins for coupling together the core 18 of the solenoid 12 and the flipper 14, respectively. Between the two end portions 50, 51, there is an intermediate necked-down portion 54 which, in this case, is generally cylindrical shaped. The flipper link 16c is molded in accordance with the above teachings so as to effectively transfer the stress and the knit lines to the necked-down portion 54, as in the case of the flipper link 16b.

Figure 6:
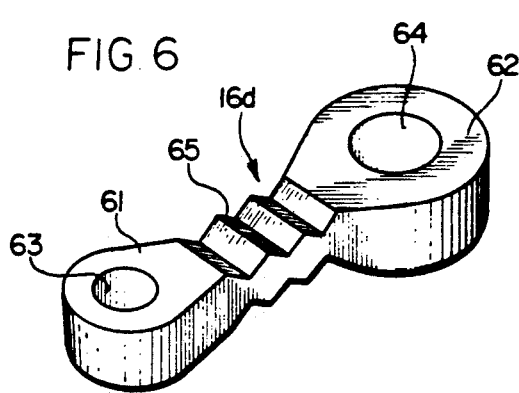
FIG. 6 is a perspective view of a flipper links exemplary of still another embodiment of the invention.

In FIG. 6, there is illustrated still another flipper link 16d which is molded in accordance with the invention. The flipper link 16d again has two end portions 61 and 62 each of which has apertures 63 and 64 formed in them, respectively. The flipper 16d also has a necked-down portion 65 which in this case is a generally rectangular area that is serrated. The flipper link 16d is molded in the manner described above to effectively transfer the stress exerted on the flipper link and the knit lines formed therein during the molding process to the necked-down portion 65 so as to reduce or eliminate the tendency of the flipper link to break.

What is claimed is:

1. A method of molding a flipper link to reduce or eliminate the tendency of said flipper link to break, said flipper link being used in flipper assemblies of pinball machines for coupling together a solenoid and a flipper of said assemblies, comprising the steps of:

forming in a mold a cavity for forming a flipper link having a first end portion, a second end portion and an intermediate necked-down portion, which necked-down portion provides an area between said first and second end portions which more easily twists and absorbs stress exerted on said flipper link during use;

providing pin means in said cavity for forming an aperture in each of said first and second end portions;

injecting plastic material into said mold to form said flipper link while gating the plastic material into said cavity at each of said first and second end portions such that said plastic material flows into said cavity about said pin means and a knit line of lines formed in said flipper link are formed in said area at a location substantially centrally of said necked-down portion, whereby said stress on said flipper link will be transferred away from said apertures to said area so as to substantially eliminate the tendency of said flipper links to break about said apertures.

* * * * *